Figure 1:
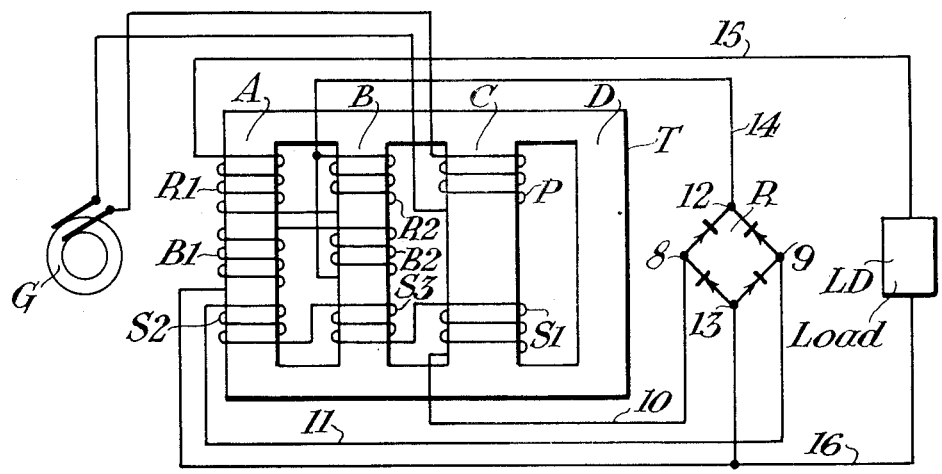

Feb. 14, 1950 — L. K. HEDDING — 2,497,499
REGULATING TRANSFORMER SYSTEM
Filed July 7, 1945 — 2 Sheets-Sheet 1

INVENTOR.
Linnie K. Hedding.
BY
HIS ATTORNEY.

INVENTOR.
Linnie K. Hedding.
BY
HIS ATTORNEY.

Patented Feb. 14, 1950

2,497,499

UNITED STATES PATENT OFFICE 2,497,499

REGULATING TRANSFORMER SYSTEM

Linnie K. Hedding, Wilkinsburg, Pa., assignor to The Union Switch & Signal Company, Swissvale, Pa., a corporation of Pennsylvania Application July 7, 1945, Serial No. 603,675

10 Claims. (Cl. 321—16)

My invention relates to regulating transformer systems, and more particularly to apparatus for regulating the output voltage characteristics of a rectifier.

There are known forms of regulating transformer systems using a saturable reactor or a saturable transformer to control the voltage applied to a load circuit through a rectifier. In such forms of apparatus the direct current output of the rectifier often controls the reluctance of the saturable transformer core upon which are mounted alternating current windings and under such arrangements the regulation that can be effected is limited, and undesirable alternating current may be caused to flow in the output or load circuit. Furthermore, the efficiency of such transformer may be reduced because the direct current flux in the transformer core tends to increase the magnetizing current.

Accordingly, a feature of my invention is the provision of improved regulating apparatus for regulating the output voltage of a rectifier.

Another feature of my invention is the provision of improved apparatus for furnishing from an alternating current source a substantially constant direct current voltage to a load regardless of the amount of current drawn by the load and regardless of voltage variations of the alternating current source.

Another feature of my invention is the provision of regulating apparatus incorporating novel means to utilize the output current of a rectifier to control the voltage applied to the rectifier without causing an alternating current component to be superimposed upon the rectifier output current.

Again, a feature of my invention is the provision of improved regulating apparatus of relatively high efficiency.

Other features, objects and advantages of my invention will appear as the specification progresses.

The foregoing features, objects and advantages of my invention are attained through a unique and improved arrangement of primary, secondary and control windings on the legs of a four or five-legged magnetizable core structure. A primary winding is mounted on one leg of the core structure and connected to an alternating current source to create an alternating current flux that threads this one leg and the remaining legs in multiple. That is, there are a plurality of magnetic circuits for the alternating current flux, the leg on which the primary winding is carried, being common to all of the different circuits.

A secondary winding is made up of a main coil mounted on the same leg as the primary winding and one or more pairs of auxiliary or compensating coils mounted one pair on each of a preselected pair of legs of the core other than the leg carrying the primary winding. The auxiliary coils are connected to add the alternating voltages induced therein and to oppose the alternating voltage induced in the main coil so that the voltage supplied by the secondary winding is the resultant of the voltage of the main coil less the sum of the voltages of the auxiliary coils. The value of the voltage induced in an auxiliary coil will depend upon the amount or portion of the alternating flux threading the leg on which that coil is mounted, but the entire alternating flux threads the main coil of the secondary winding because this coil is mounted on the leg common to all the magnetic circuits. The secondary winding is connected to input terminals of a rectifier, to the output terminals of which rectifier a load circuit is connected, and which load circuit may take different forms and may include a load element drawing direct current of variable amounts. In some forms of the apparatus a battery may be connected to the load circuit to serve as a standby source of power and to be at times charged by the output current of the rectifier.

A regulating winding is interposed in the load circuit and such regulating winding is made up of one or more pairs of coils mounted one coil on each leg of the core carrying an auxiliary coil of the secondary winding. Such regulating coils may also be mounted on legs other than those carrying the auxiliary coils of the secondary winding. The interconnection of a pair of regulating coils is such that the direct current fluxes created thereby due to the load current are additive and provide a magnetic flux condition on these two legs on which these regulating coils are mounted that varies with the load current and tends to cause a corresponding variation of the alternating current flux that threads these legs. This causes the alternating voltages induced in a pair of auxiliary coils to vary with the load. Ordinarily the arrangement is such that as the load increases the alternating voltage of the auxiliary coils decreases and the resultant alternating voltage supplied by the secondary winding increases to increase in turn the voltage applied to the rectifier. The reverse condition can be effected if desired. With such connections of a pair of regulating coils, the alternating voltages induced therein tend to neutralize and with the coils of equal number of turns the voltages cancel each other and substantially no alternating voltage is impressed upon the load circuit. That is to say, the output or load current is utilized to regulate the alternating voltage applied to the rectifier and in turn to regulate the output voltage of the rectifier with no alternating current component superimposed on the load current.

Another winding connected across the output terminals of the rectifier in multiple with the load circuit may be mounted on the core structure to serve as a biasing winding for establishing a preselected and desired flux condition of the core.

I shall describe several forms of apparatus embodying my invention, and shall then point out the novel features thereof in claims.

Figure 2:
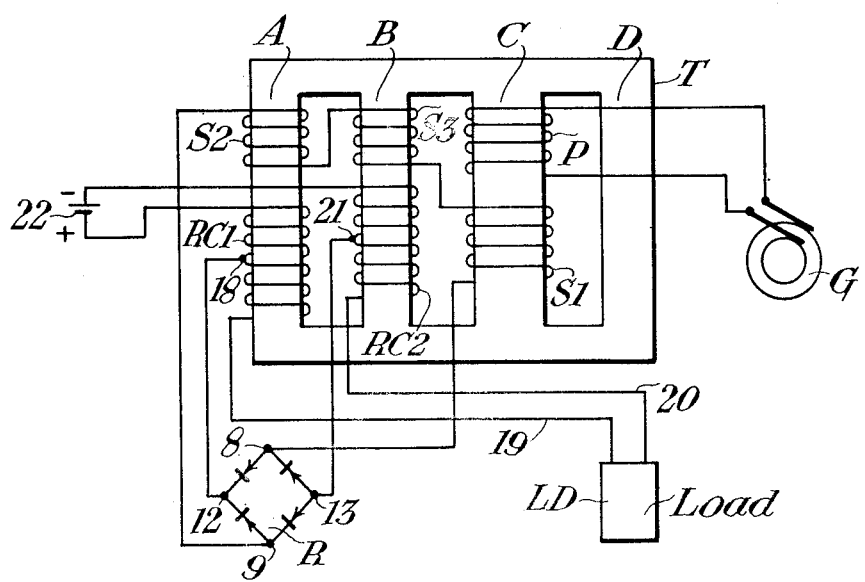
Figure 3:
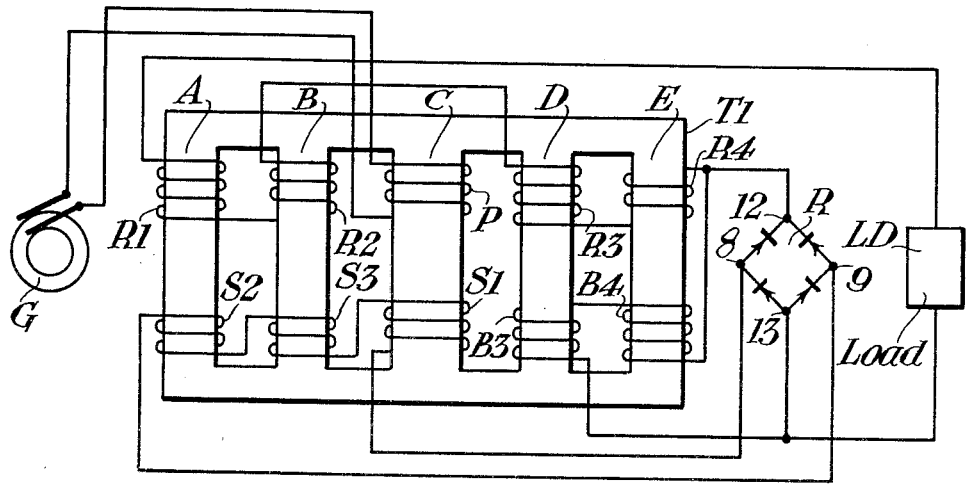
Figure 4:
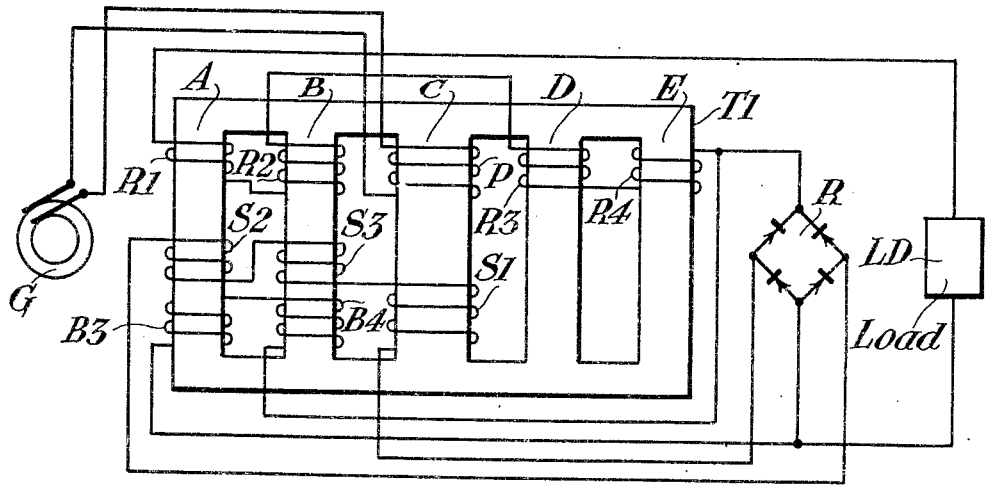

In the accompanying drawings, Figs. 1 and 2 are diagrammatic views each showing a form of apparatus embodying my invention when used with a four-legged magnetizable core structure. Figs. 3 and 4 are diagrammatic views each showing a form of apparatus embodying my invention when used with a five-legged magnetizable core structure.

Similar reference characters refer to similar parts in each of the several views.

Referring to Fig. 1, an alternating current is supplied from a generator G through a transformer T to a rectifier R for supplying rectified or unidirectional current to a load circuit including a load element shown conventionally at LD.

The generator G may supply alternating current of any suitable voltage and frequency, such as for example, 110 volts at the commercial frequency of 60 cycles per second.

The transformer T is provided with a four-legged core structure of suitable magnetizable material such as iron, the separate legs being designated by the reference characters A, B, C, and D. A primary winding P mounted on leg C of the core structure is connected to generator G and thus an alternating flux is created in the leg C and in the legs A, B, and D in multiple. In other words, the leg C and D form one magnetic circuit and leg C with legs A and B in multiple form another magnetic circuit.

A secondary winding comprising three coils, S1, S2, and S3 is mounted on the core structure, coil S1 being a main coil mounted on leg C along with primary winding P, and coils S2 and S3 being auxiliary coils mounted on legs A and B, respectively. These three coils S1, S2 and S3 are connected in series with auxiliary coils S2 and S3 connected to add the alternating voltages induced therein and for these two voltages to oppose the alternating voltage induced in the main coil S1. The coils are proportioned as to their number of turns for the main coil S1 to have a greater number of turns than both coils S2 and S3, and thus the secondary winding supplies a predetermined alternating voltage which is the resultant voltage of that induced in the main coil S1 less the sum of the two voltages induced in the coils S2 and S3. Coils S2 and S3 may have an equal number of turns and are preferably so arranged. This secondary winding of transformer T is connected to input terminals 8 and 9 of rectifier R through wires 10 and 11. Thus there appears at the output terminals 12 and 13 of the rectifier a rectified voltage corresponding to the voltage supplied by the secondary winding.

A regulating winding is mounted on the core structure of transformer T and which winding comprises a pair of coils R1 and R2 mounted on the core legs A and B, respectively. This regulating winding is interposed in the load circuit supplied by the rectifier, and which load circuit can be traced from output terminal 12 of the rectifier through wire 14, regulating coils R2 and R1 in series, wire 15, load element LD and wire 16 to the other output terminal 13 of the rectifier. It follows that when the load circuit is closed, rectified current supplied thereto flows in regulating coils R1 and R2 and creates a direct current flux in legs A and B and which flux varies with variations in the load current. Coils R1 and R2 are interconnected to add their effects and the parts are proportioned so that as the load current increases magnetic saturation of legs A and B is approached with the result that less of the alternating current flux threads the legs A and B and a larger portion of the alternating flux threads the leg D on which no winding is mounted. With the alternating current flux threading through legs A and B reduced as the load current increases, the alternating voltage induced in auxiliary coils S2 and S3 is reduced and the alternating voltage supplied by the secondary winding of the transformer to the rectifier is increased. The arrangement is such that this increase in the alternating voltage applied to the rectifier compensates for the additional voltage drop through the rectifier elements and other elements of the load circuits due to the larger load currents, and the voltage applied to the load remains substantially constant regardless of the current drawn by the load element.

With such connections for the regulating coils R1 and R2, it is clear that the alternating voltages created in these coils due to the alternating flux threading legs A and B in multiple tend to neutralize each other and with coils R1 and R2 made of an equal number of turns, the two alternating voltages cancel and substantially no alternating current component is superimposed on the load current. In some forms of the load element, such alternating current component of the load current may be very troublesome.

A biasing winding is preferably provided for the core structure and in Fig. 1 such winding comprises a pair of biasing coils B1 and B2 mounted on legs A and B, respectively. The coils B1 and B2 in series are connected across output terminals 12 and 13 of rectifier R in multiple with the load circuit. Consequently rectified current flows in coils B1 and B2 to create a direct flux in the core structure, the coils B1 and B2 being interconnected to add their effects. Furthermore, coils B1 and B2 are preferably disposed for the direct flux created thereby to oppose the direct flux created by the regulating coils R1 and R2 in the manner explained hereinbefore. In this way the biasing coils B1 and B2 serve to establish a predetermined flux condition for the core structure to improve the operation of the apparatus, but such biasing coils may be omitted.

When alternating current is applied from generator G to the primary winding P under no load condition, an alternating voltage which is the resultant of the voltage induced in the main coil S1 less the sum of the voltages induced in the auxiliary coils S2 and S3 is applied to the input terminals of the rectifier R, and rectified current flows in the biasing coils B1 and B2 to establish a predetermined flux condition for the core structure.

Assuming next that the load circuit is closed and load current flows, such load current flows in regulating coils R1 and R2 to create a flux that opposes the biasing flux created by coils B1 and B2 and establishes a corresponding degree of saturation for the core legs A and B, it being understood that the regulating coils R1 and R2 are proportioned so that the flux created thereby greatly predominates over the biasing flux created by the coils B1 and B2. This direct current flux thus created in the legs A and B tends to reduce the alternating flux that threads these legs and to force a greater portion of the alternating flux through the leg D with the result that the alternating voltages induced in the auxiliary coils S2 and S3 of the secondary winding decrease as the load current increases. Thus the alternating voltage applied to the input terminals of rectifier R is increased as the load increases, such voltage increase compensating the increase in the voltage drop in the rectifier elements and other elements of the load circuit, and the voltage applied to the load remains substantially constant for all conditions of load current.

It is apparent that with the regulating coils R1 and R2 of equal number of turns and connected in the manner shown, the alternating voltages induced therein are substantially equal and opposite and cancel each other so that no alternating current is superimposed upon the load current.

As pointed out hereinbefore, the biasing winding comprising coils B1 and B2 can be omitted by proper proportioning of the parts, and the apparatus of Fig. 1 will operate in substantially the same manner as explained above.

Referring to Fig. 2, current is supplied from the alternating current generator G to a direct current load element LD through a transformer T having a four-legged magnetizable core structure and a rectifier R, the same as in Fig. 1. Also, transformer T is provided with a primary winding P mounted on leg C and with a secondary winding comprising a main coil S1 mounted on leg C and a pair of auxiliary coils S2 and S3 mounted on legs A and B, respectively, and connected to input terminals 8 and 9 of rectifier R the same as in Fig. 1.

A combination regulating and compensating winding comprising coils RC1 and RC2 is provided for transformer T of Fig. 2, coils RC1 and RC2 being mounted on legs A and B, respectively, along with the auxiliary coils S2 and S3. Preselected portions of coils RC1 and RC2 are interposed in the load circuit which extends from output terminal 12 of rectifier R to an intermediate terminal 18 of coil RC1, lower portion of coil RC1, wire 19, load element LD, wire 20, lower portion of coil RC2 to an intermediate terminal 21 and to the output terminal 13 of the rectifier. Coils RC1 and RC2 are wound such that the direct current fluxes created by the load current are additive and tend to create a predetermined degree of saturation for the legs A and B as the load current increases.

A battery 22 is connected across the output terminals of rectifier R through the top portions of coils RC1 and RC2 as will be readily understood by an inspection of Fig. 2.

Under no load condition the voltage at the output terminals of rectifier R is applied to battery 22 through the top portions of coils RC1 and RC2 and with battery 22 poled as indicated by the plus and minus signs the rectifier voltage tends to overcome the voltage of the battery and if the voltage of the battery is low a charging current is supplied to the battery. The parts are so proportioned that the voltage of battery 22 is normally about equal to the rectified voltage and only little if any current flows to the battery. The parts are further so proportioned that the flux thus created by the top portion of the coils RC1 and RC2 creates a small biasing flux in the legs A and B, and at such magnetic condition of the core the alternating voltages induced in the auxiliary coils S2 and S3 are relatively large so that the resultant alternating voltage supplied to the rectifier by the secondary winding of the transformer is at a predetermined value. With the load circuit closed and load current flowing in the lower portions of the coils RC1 and RC2, a direct current flux is created which tends to saturate the legs A and B at full load conditions, and which flux in turn causes a greater portion of the alternating current flux to thread through the leg D. This causes the alternating voltages induced in coils S2 and S3 to be correspondingly decreased so that the voltage applied to the rectifier tends to increase as the load increases, with the result the voltage applied to the load circuit is maintained substantially constant regardless of the current drawn by the load element. It will be readily apparent that with the performance thus described the current flowing into or out of the battery 22 will remain substantially constant regardless of variations in load current, that is, the rectifier will supply practically all current required by the load. Coils RC1 and RC2 are made of substantially equal number of turns and terminals 18 and 21 are connected at corresponding points on the coils with the lower portions greater than the top portions. Thus the alternating voltages induced in the lower portions of the coils due to the alternating flux are substantially equal and opposite and no alternating current is superimposed upon the load circuit current.

In the event the voltage of the alternating current generator G rises above its normal value, the increased value of the rectifier output voltage tends to cause current to flow in the top portions of the coils RC1 and RC2 through battery 22, and the direct current flux created thereby opposes the direct current flux created by the lower portions of the regulating coils and the resultant direct current flux in legs A and B is reduced so that the resultant alternating voltage supplied by the secondary winding is correspondingly reduced. In the event the voltage of the alternating source falls below its normal value, the output voltage of the rectifier decreases and current tends to flow from battery 22 to the load. This current from battery 22 flows in the full portions of coils RC1 and RC2 and increases the direct flux with the result that the alternating voltages induced in auxiliary coils S2 and S3 are decreased and the alternating voltage applied to the rectifier from the secondary winding is correspondingly increased. In other words, in Fig. 2, the load current is maintained practically constant regardless of variations in the amount of current drawn by the load and regardless of variations in the voltage of the alternating current source.

In case of a complete failure of the alternating current source the output from the rectifier disappears and the battery 22 will supply the entire load circuit. That is, battery 22, serves as a standby source of supply.

In Fig. 3, the apparatus includes a transformer T1 having a five-legged core structure of suitable magnetizable material, such as iron, the legs being identified by the reference characters A, B, C, D, and E. Primary winding P is mounted on leg C and connected to generator G to create an alternating current flux that flows in leg C and in legs A, B, D, and E in multiple. In another way of looking at it, the leg C with the legs A and B in multiple form one magnetic circuit and the leg C with the legs D and E in multiple form a second magnetic circuit.

A secondary winding comprising a main coil S1 mounted on leg C and a pair of auxiliary coils S2 and S3 mounted on legs A and B, respectively, is provided the same as in Figs. 1 and 2, the secondary winding being connected to input terminals 8 and 9 of rectifier R.

A regulating winding comprising two pairs of regulating coils is provided for transformer T1. A first pair includes coils R1 and R2 mounted on legs A and B, respectively, and a second pair includes coils R3 and R4 mounted on legs D and E, respectively. These coils are connected in series and interposed in a load circuit, such load circuit being traced from output terminal 12 of the rectifier R, through coils R4, R3, R2 and R1 in the order named, and load LD to the other output terminal 13 of the rectifier. Coils R1 and R2 are interconnected to create direct current fluxes that are additive and circulate in legs A and B, and coils R3 and R4 are interconnected to create direct current fluxes that are additive and circulate in legs D and E.

A biasing winding comprising coils B3 and B4 mounted on legs D and E, respectively is preferably provided. This winding is connected across the output terminals of the rectifier, and the coils B3 and B4 are interconnected to add their effects and are wound on the legs so that the flux created thereby opposes the flux created by the pair of regulating coils R3 and R4, and coils B3 and B4 are proportioned to have a larger number of turns than coils R3 and R4.

Under no load condition, the flux created by coils B3 and B4 tends to saturate legs D and E and a major portion of the alternating current flux threads legs A and B causing the opposing alternating voltages induced in the auxiliary coils S2 and S3 to be correspondingly high so that the resultant alternating voltage applied to the rectifier is maintained at a preselected value.

With a load current flowing the direct current flux resulting from the regulating coils R1 and R2 tends to saturate legs A and B and the direct current flux due to regulating coils R3 and R4 tends to reduce the direct flux in the legs D and E with the result that a greater portion of the alternating flux threads the legs D and E. This decrease in the alternating flux threading the legs A and B causes a corresponding reduction in the alternating voltages induced in coils S2 and S3 with the result that the resultant voltage supplied to rectifier is increased as the load increases. Consequently, the apparatus of Fig. 3 compensates for the additional voltage drop in the rectifier elements and other load circuit elements due to an increase in the load current, and a substantially constant voltage is applied to the load regardless of the current drawn by the load element.

It is to be observed that the alternating voltages induced in the pair of regulating coils R1 and R2 substantially cancel each other and similarly the alternating voltages induced in the pair of regulating coils R3 and R4 substantially cancel each other, and no alternating current is superimposed on the load current.

In Fig. 4, the apparatus of Fig. 3 is modified by placing biasing coils B3 and B4 on legs A and B in place of on legs D and E as disclosed in Fig. 3. The form of apparatus disclosed in Fig. 4 is peculiarly useful in supplying a load circuit in which a counterelectromotive force is present, such as is the case when a storage battery is to be charged. When a maximum load current is flowing, that is, when the voltage of the battery is low and a charging current is being supplied to the battery, the flux created by the coils B3 and B4 is neutralized by the flux created by the regulating coils R1 and R2 and the flux of the regulating coils R3 and R4 acts to substantially saturate the legs D and E. Under such circumstances a major portion of the alternating current flux threads legs A and B and the alternating voltages induced in the auxiliary coils S2 and S3 are relatively large so that the resultant alternating voltage of the secondary winding as applied to the rectifier R is correspondingly relatively small. When the voltage of the battery rises due to a charged condition, the charging current, that is, the load current, supplied from the rectifier R decreases and as a result the flux of the biasing coils B3 and B4 will predominate over the direct flux created by the regulating coils R1 and R2, and at the same time the regulating flux created by the coils R3 and R4 threading legs D and E is reduced. Under these circumstances a major portion of the alternating current flux would thread the legs D and E and a lower alternating voltage will be induced in the auxiliary coils S2 and S3 with the result that the resultant alternating voltage applied to the rectifier is increased to overcome the higher counter voltage of the battery under the full charge condition.

Again it is to be observed that the alternating voltages induced in the pair of regulating coils R1 and R2 and in the pair of regulating coils R3 and R4 cancel and no alternating voltage is superimposed on the load circuit.

Although I have herein shown and described several forms of regulating transformer systems embodying my invention, it is to be understood that various changes and modifications may be made therein within the scope of the appended claims without departing from the spirit and scope of my invention.

Having thus described my invention, what I claim is:

1. In regulating apparatus, the combination comprising, a magnetizable core structure having at least four legs, a primary winding mounted on one leg of the core and connected to an alternating current source to create an alternating current flux that threads the remaining legs of the core in multiple, a secondary winding comprising a main coil mounted on said one leg and two auxiliary coils mounted one on each of two other legs of said core, said main and auxiliary coils connected in series to input terminals of a rectifier and disposed for the auxiliary coils to add their alternating voltages and to oppose the alternating voltage of the main coil, a load circuit connected to output terminals of said rectifier to receive current of a value predetermined by the resultant voltage of said secondary winding, and a pair of regulating coils mounted one on each leg carrying an auxiliary coil and interposed in series aiding in said load circuit to regulate the portion of the alternating current flux threading the legs carrying said auxiliary coils according to the load circuit current.

2. In regulating apparatus, the combination comprising, a magnetizable core structure having at least four legs, a primary winding mounted on a first one of the legs and connected to an alternating source to create an alternating current flux that is distributed through alternative magnetic circuits of which said one leg is common to all, a secondary winding comprising a main coil mounted on said one leg and a pair of auxiliary coils mounted one on each of a second and a third leg of the core, said main and auxiliary coils connected in series and disposed for the alternating voltage induced in the main coil to be opposed by the alternating voltages induced in the auxiliary coils, a rectifier connected to said secondary winding to receive the resultant alternating voltage of said main and auxiliary coils, a direct current load circuit connected to said rectifier, a regulating winding comprising a pair of coils mounted one on each of said second and third legs, and said regulating coils provided with equal turns and interconnected in such a manner that when interposed in said load circuit a direct current flux is created which varies the alternating current flux threading said second and third legs according to variations of the load circuit current and the alternating voltages induced in the regulating coils cancel each other.

3. In regulating apparatus, the combination comprising, a magnetizable core structure having four legs, a primary winding mounted on a first one of said legs and connected to an alternating current source to create alternating flux that threads the remaining three legs in multiple, a secondary winding having a main coil mounted on said one leg and a first and a second auxiliary coil mounted on a second and a third one of said legs respectively, said auxiliary coils interconnected to add their alternating voltages and to oppose the alternating voltage of said main coil, a rectifier connected to said secondary winding, a load circuit including a load element and a pair of regulating coils connected to said rectifier to receive current due to the voltage of said secondary winding, and said regulating coils mounted one on each of said second and third ones of said legs to create a direct flux for regulating the distribution of the alternating flux in said three remaining legs whereby the voltage supplied by said secondary winding is varied in accordance to variations of the load current.

4. In regulating apparatus, the combination comprising, a magnetizable core structure having four legs, a primary winding mounted on a first one of said legs and connected to an alternating current source to create alternating flux that threads the remaining three legs in multiple, a secondary winding having a main coil mounted on said one leg and a first and a second auxiliary coil mounted on a second and a third one of said legs respectively, said auxiliary coils interconnected to add their alternating voltages and to oppose the alternating voltage of said main coil, a rectifier connected to said secondary winding, a load circuit including a load element and a pair of regulating coils connected to said rectifier to receive current due to the voltage of said secondary winding, said regulating coils mounted one on each of the legs carrying one of said auxiliary coils and disposed to add the direct fluxes created due to the load current to regulate the voltage of said secondary winding in accordance with the load current, and said regulating coils proportioned to substantially neutralize the alternating voltages induced in each other.

5. In regulating apparatus, the combination comprising, a magnetizable core structure having four legs, a primary winding mounted on a first one of said legs and connected to an alternating current source to create alternating flux that threads the remaining three legs in multiple, a secondary winding having a main coil mounted on said one leg and a first and a second auxiliary coil mounted on a second and a third one of said legs respectively, said auxiliary coils interconnected to add their alternating voltages and to oppose the alternating voltage of said main coil, a rectifier connected to said secondary winding, a pair of biasing coils mounted one on each of said second and third legs and connected in series aiding to the output terminals of said rectifier to create a predetermined biasing direct flux in said second and third legs, a load circuit including a load element and a pair of regulating coils connected to the output terminals of said rectifier to energize said load element due to the voltage supplied by said secondary winding, and said regulating coils mounted one on each of said second and third legs and proportioned and interconnected to substantially cancel the alternating voltages induced in the regulating coils and to overcome the bias direct flux and create a direct flux that maintains a substantially constant output voltage of said rectifier regardless of the current drawn by said load element.

6. In regulating apparatus, the combination comprising, a unitary magnetizable core structure having four legs, a primary winding mounted on a first one of said legs and connected to an alternating current source to create an alternating flux that flows in a first magnetic circuit including said one leg and a second and a third one of the legs in multiple and in a second magnetic circuit including said first leg and a fourth one of the legs, a secondary winding comprising a main coil mounted on said first leg and a pair of auxiliary coils mounted one on each of said second and third legs, said main and auxiliary coils connected for the alternating voltages of the auxiliary coils to oppose the alternating voltage of the main coil, a rectifier connected to said secondary winding to be supplied with such alternating voltage, a load circuit connected to said rectifier to receive rectified current due to such supplied alternating voltage, a pair of regulating coils having equal number of turns and mounted one on each of said second and third legs, and said regulating coils interposed in said load circuit to add the direct fluxes as created by said load current, whereby a substantially constant voltage is supplied to the load circuit regardless of the amount of current drawn by the load circuit and substantially no alternating voltage is impressed upon the load circuit.

7. In regulating apparatus, the combination comprising, a magnetizable core structure having five legs, a primary winding mounted on a first one of said legs and connected to an alternating current source to create an alternating flux that threads the remaining four legs in multiple, a secondary winding comprising a main coil mounted on said first leg and a pair of auxiliary coils mounted one on each of a second and a third one of said legs, a rectifier connected across said secondary winding to supply a rectified voltage due to the resultant alternating voltage of said secondary winding, a pair of biasing coils mounted one on each of a fourth and a fifth one of said legs and connected to the output of said rectifier to provide a preselected direct flux in said core, a load circuit including in series a load element and a first and a second pair of regulating coils, said first pair of regulating coils mounted one on each of said second and third legs and said second pair mounted one on each of said fourth and fifth legs, and the coils of each said pair of regulating coils proportioned and interconnected to substantially cancel the alternating voltages induced therein and to add the direct flux created by the load circuit current flowing therein whereby a substantially constant value of voltage is applied to said load circuit regardless of the current drawn by said load element.

8. In regulating apparatus, the combination comprising, a magnetizable core structure having five legs, a primary winding mounted on a first one of said legs and connected to an alternating current source to create an alternating flux that threads the remaining four legs in multiple, a secondary winding comprising a main coil mounted on said first leg and a pair of auxiliary coils mounted one on each of a second and a third one of said legs, a rectifier connected across said secondary winding to supply a rectified voltage due to the resultant alternating voltage of said secondary winding, a pair of biasing coils mounted one on each of said second and third legs and connected to the output of said rectifier to provide a preselected direct flux in said core, a load circuit including in series a load element and a first and a second pair of regulating coils connected to the output of said rectifier to receive current due to the resultant voltage of said secondary winding, said first pair of regulating coils mounted one on each of said second and third legs and said second pair of regulating coils mounted one on each of a fourth and a fifth leg of said core, and each pair of said regulating coils proportioned and interconnected to substantially cancel the alternating voltages induced therein and to add the direct fluxes created in the respective legs due to the load circuit current flowing therethrough.

9. In regulating apparatus, the combination comprising, a magnetizable core structure having four legs, a primary winding mounted on a first one of said legs and connected to a source of alternating current to create an alternating flux that threads the three remaining legs of said core in multiple, a secondary winding including a main coil mounted on said first leg and a pair of auxiliary coils mounted one on each of a second and a third leg of the core, a rectifier connected to said secondary winding, said auxiliary coils disposed to add their alternating voltages and to oppose the alternating voltage of said main coil to apply to said rectifier a resultant alternating voltage, a pair of regulating coils mounted one on each of said second and third legs, a load circuit including a load element and a preselected first portion of each of said regulating coils connected to said rectifier to receive current due to said resultant voltage, a standby battery connected to said rectifier through the remaining portion of each of said regulating coils, and said regulating coils proportioned and disposed to substantially cancel the alternating voltages induced therein due to said alternating flux and to vary the alternating flux threading the second and third legs according to the load current.

10. In regulating apparatus, the combination comprising, a unitary magnetizable core structure having four legs, a primary winding mounted on a first one of said legs and connected to a source of alternating current to create an alternating flux that flows in a plurality of magnetic paths of which said first leg is common to all, a secondary winding comprising a main coil mounted on said first leg and a pair of auxiliary coils mounted one on each of a second and a third one of said legs, said main and auxiliary coils connected in series and disposed for the alternating voltages of the auxiliary coils to oppose the alternating voltage of the main coil, a rectifier having input terminals connected across said secondary winding, a pair of regulating coils mounted one on each of said second and third legs, said regulating coils having equal number of turns and provided with similarly disposed intermediate terminals and to which intermediate terminals the output terminals of said rectifier are connected, a load circuit connected to one outside terminal of each of said regulating coils to receive direct current through a first portion of each of the regulating coils in series due to the alternating voltage of said secondary winding, and a battery connected to the other outside terminal of each of the regulating coils and poled to oppose the output voltage of said rectifier, whereby a substantially constant voltage is applied to the load circuit regardless of variations in the voltage of the alternating current source and a substantially constant battery current flows regardless of the current drawn by the load circuit and the load circuit is free from having an alternating voltage impressed thereon.

LINNIE K. HEDDING.

REFERENCES CITED

The following references are of record in the file of this patent:

UNITED STATES PATENTS

| Number | Name | Date |
| --- | --- | --- |
| 1,995,637 | Day | Mar. 26, 1935 |
| 2,092,859 | Seaverson | Sept. 14, 1937 |
| 2,316,331 | Hedding | Apr. 13, 1943 |